(12) United States Patent
Chahwan et al.

(10) Patent No.: US 9,823,859 B2
(45) Date of Patent: Nov. 21, 2017

(54) MECHANICAL SHOCK MITIGATION FOR DATA STORAGE

(71) Applicant: Western Digital Technologies, Inc., Irvine, CA (US)

(72) Inventors: Alain Chahwan, Irvine, CA (US); Choo-Bhin Ong, Foothill Ranch, CA (US); Meiman Lin Syu, Fremont, CA (US); Kevin Chiteh Chao, Irvine, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 314 days.

(21) Appl. No.: 14/671,434

(22) Filed: Mar. 27, 2015

(65) Prior Publication Data
US 2016/0132257 A1   May 12, 2016

Related U.S. Application Data

(60) Provisional application No. 62/076,081, filed on Nov. 6, 2014.

(51) Int. Cl.
*G06F 11/30* (2006.01)
*G07C 5/00* (2006.01)
(Continued)

(52) U.S. Cl.
CPC ............ *G06F 3/0617* (2013.01); *G06F 3/068* (2013.01); *G06F 3/0653* (2013.01);
(Continued)

(58) Field of Classification Search
CPC ...... G06F 3/0617; G06F 3/0656; G06F 3/068; G06F 3/0653; G06F 2003/0692;
(Continued)

(56) References Cited

U.S. PATENT DOCUMENTS

| 4,638,289 A | * | 1/1987 | Zottnik | ................. G01P 1/127 246/45 |
| 4,819,153 A | * | 4/1989 | Graham | ............... G06F 3/0601 360/69 |

(Continued)

FOREIGN PATENT DOCUMENTS

| JP | 2003007013 A | * | 1/2003 |
| JP | 3909185 B2 | * | 4/2007 |

(Continued)

OTHER PUBLICATIONS

Alain Chahwan, et al., U.S. Appl. No. 14/244,188, filed Apr. 3, 2014, 16 pages.

*Primary Examiner* — Jaime Figueroa (74) *Attorney, Agent, or Firm* — Barry IP Law (57) ABSTRACT

A device adapted to capture vehicle data or surveillance data that includes a disk and a Non-Volatile Solid-State Memory (NVSM). The vehicle or surveillance data is received in a buffer of the device for storage on the disk, and an input is received indicating a level of mechanical shock. It is determined whether the input indicates the level of mechanical shock exceeds a first threshold indicative of an impact. If the input indicates the level of mechanical shock exceeds the first threshold, the vehicle or surveillance data is stored in the NVSM from the buffer and a status is determined for storing data on the disk.

22 Claims, 6 Drawing Sheets

(51) Int. Cl.
- *G01M 17/00* (2006.01)
- *G06F 7/00* (2006.01)
- *G06F 19/00* (2011.01)
- *G06F 3/06* (2006.01)
- *G07C 5/08* (2006.01)
- *G06F 12/0866* (2016.01)

(52) U.S. Cl.
CPC .............. *G06F 3/0656* (2013.01); *G07C 5/08* (2013.01); *G07C 5/085* (2013.01); *G06F 12/0866* (2013.01); *G06F 2003/0692* (2013.01); *G06F 2212/1032* (2013.01); *G06F 2212/173* (2013.01); *G06F 2212/205* (2013.01); *G06F 2212/217* (2013.01); *G06F 2212/222* (2013.01); *G06F 2212/281* (2013.01); *G07C 5/008* (2013.01); *G07C 5/0866* (2013.01)

(58) Field of Classification Search
CPC ....... G06F 2212/1032; G06F 2212/205; G06F 2212/217; G06F 2212/222; G06F 2212/281; G06F 12/0866; G06F 2212/173; G07C 5/085; G07C 5/08; G07C 5/0866; G07C 5/008
USPC ........................................................ 701/32.2
See application file for complete search history.

(56) References Cited

U.S. PATENT DOCUMENTS

| | | |
|---|---|---|
| 5,333,138 A * | 7/1994 | Richards ............... G11B 19/04 360/60 |
| 5,995,462 A * | 11/1999 | Harold-Barry ....... G11B 7/0946 369/53.18 |
| 6,714,371 B1 * | 3/2004 | Codilian ............... G11B 5/5582 360/60 |
| 6,781,780 B1 * | 8/2004 | Codilian ............... G11B 5/5526 360/53 |
| 6,856,556 B1 | 2/2005 | Hajeck |
| 6,967,804 B1 | 11/2005 | Codilian |
| 6,975,476 B1 | 12/2005 | Berding |
| 7,126,857 B2 | 10/2006 | Hajeck |
| 7,430,136 B2 | 9/2008 | Merry, Jr. et al. |
| 7,447,807 B1 | 11/2008 | Merry et al. |
| 7,492,541 B2 | 2/2009 | Gokita |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,179,626 B1 | 5/2012 | Ryan et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,767,332 B1 | 7/2014 | Chahwan et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2006/0206681 A1 * | 9/2006 | Suzuki .................. G11B 20/10 711/170 |
| 2008/0024899 A1 * | 1/2008 | Chu ...................... G06F 3/0614 360/69 |
| 2008/0162803 A1 * | 7/2008 | Masuo ................... G06F 3/061 711/112 |
| 2009/0024274 A1 * | 1/2009 | Nagai ..................... G07C 5/085 701/33.4 |
| 2010/0174849 A1 | 7/2010 | Walston et al. |
| 2010/0250793 A1 | 9/2010 | Syu |
| 2011/0099323 A1 | 4/2011 | Syu |
| 2011/0238887 A1 | 9/2011 | Bazzani |
| 2011/0283049 A1 | 11/2011 | Kang et al. |
| 2012/0151118 A1 * | 6/2012 | Flynn ................... G06F 11/1008 711/6 |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |

(56) References Cited

U.S. PATENT DOCUMENTS

| | | |
|---|---|---|
| 2014/0181432 A1 | 6/2014 | Horn |
| 2014/0223255 A1 | 8/2014 | Lu et al. |
| 2015/0269081 A1* | 9/2015 | Shu .................... G06F 12/0868 |
| | | 369/53.42 |

FOREIGN PATENT DOCUMENTS

| | | | |
|---|---|---|---|
| JP | 3922348 B2 * | 5/2007 | |
| JP | 2009169869 A * | 7/2009 | |

\* cited by examiner

MECHANICAL SHOCK MITIGATION FOR DATA STORAGE

CROSS-REFERENCE TO RELATED APPLICATION

This application claims the benefit of U.S. Provisional Application No. 62/076,081 filed on Nov. 6, 2014, and entitled "SOLID-STATE HYBRID DRIVE (SSHD) HANDLING OF CATASTROPHIC ACCIDENTS IN AUTOMOTIVE SURVEILLANCE APPLICATIONS" by Alain Chahwan et al., which is hereby incorporated by reference in its entirety.

BACKGROUND

Data Storage Devices (DSDs) are often used to record data onto or to reproduce data from a storage media. One type of storage media includes a rotating magnetic disk where a magnetic head of the DSD can read and write data in tracks on a surface of the disk, such as in a Hard Disk Drive (HDD). Another type of storage media can include a solid-state memory where cells are charged to store data. Recently, Solid-State Hybrid Drives (SSHDs) have been introduced that can include both a rotating magnetic disk and a solid-state memory for non-volatilely storing data.

A large impact to a DSD including a disk can cause problems in reading or writing data on the disk, and may even render the disk unusable for accessing data from the disk. This can cause problems especially when the disk is used to store surveillance or vehicle data where the data recorded around the time of a large impact can be important. For example, such data may be used to determine a cause of an accident or in the investigation of a crime.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

System Overview

Figure 1:
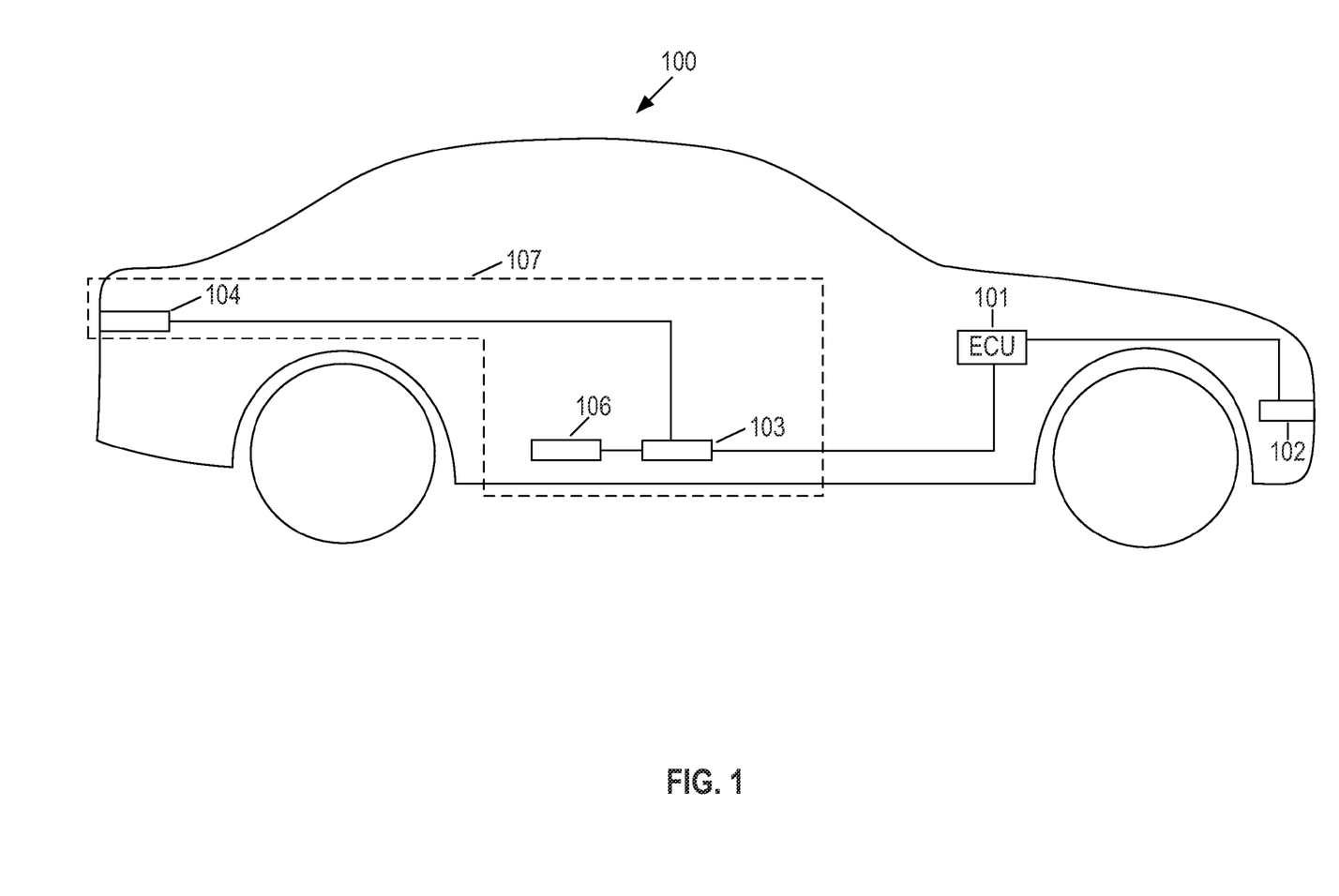
FIG. 1 is a block diagram depicting a vehicle with a device for capturing vehicle data according to an embodiment.

FIG. 1 is a block diagram depicting vehicle 100 with device 107 for capturing vehicle data according to an embodiment. Although FIG. 1 depicts vehicle 100 as an automobile, device 107 can be used in different vehicles such as, for example, a truck, airplane, helicopter, boat, bus, train, or motorcycle. In yet other embodiments, device 107 can be a surveillance system located in, for example, a business, home, warehouse, institution, or a public place.

In the example of FIG. 1, device 107 includes camera 104, host surveillance unit 103, and Data Storage Device (DSD) 106. In the various embodiments described below, the DSD 106 can be configured to preserve surveillance or vehicle data that may be critical to accident investigation.

Host surveillance unit 103 is in communication with camera 104 and DSD 106. In addition, host surveillance unit 103 is also in communication with Electronic Control Unit (ECU) 101, which in turn, is in communication with impact sensor 102. ECU 101 provides electronic control of vehicle 100 and can send vehicle data to host surveillance unit 103 for storage in DSD 106. Example of vehicle data provided by ECU 101 can include, for example, information concerning an impact detected by sensor 102, a speed or acceleration of vehicle 100, seat belt or airbag indicators, or a braking or steering history of vehicle 100. The vehicle data can also come from camera 104, which may provide video or other image data to host surveillance unit 103 as vehicle data for storage in DSD 106.

Figure 2:
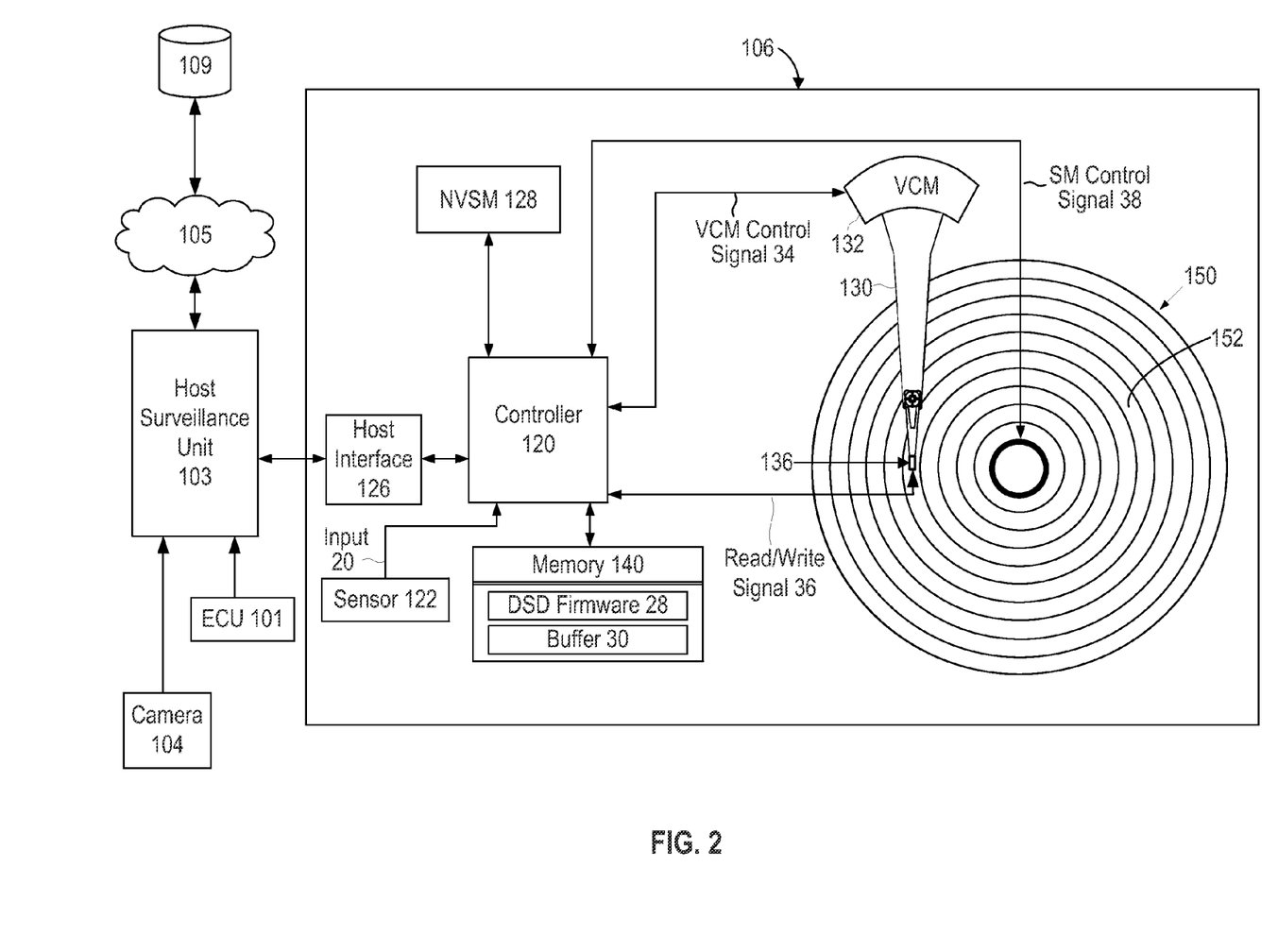
FIG. 2 is a diagram providing more detail on the device of FIG. 1 according to an embodiment.

FIG. 2 is a diagram providing more detail on device 107 according to an embodiment. In the embodiment of FIG. 2, DSD 106 includes Non-Volatile Memory (NVM) in the form of rotating magnetic disk 150 and Non-Volatile Solid-State Memory (NVSM) 128. In this regard, DSD 106 can be considered a Solid-State Hybrid Drive (SSHD) since it includes both solid-state and disk media. In other embodiments, each of disk 150 or NVSM 128 may be replaced by multiple Hard Disk Drives (HDDs) or multiple Solid-State Drives (SSDs), respectively, so that DSD 106 includes pools of HDDs and/or SSDs. Other embodiments may also include different components than those shown in FIG. 2.

DSD 106 includes controller 120 which includes circuitry such as one or more processors for executing instructions and can include a microcontroller, a DSP, an Application-Specific Integrated Circuit (ASIC), a Field-Programmable Gate Array (FPGA), hard-wired logic, analog controller and/or a combination thereof. In one implementation, controller 120 can include a System on a Chip (SoC).

Host interface 126 is configured to interface DSD 106 with host surveillance unit 103 and may interface according to a standard such as, for example, Serial Advanced Technology Attachment (SATA), PCI express (PCIe), Small Computer System Interface (SCSI), or Serial Attached SCSI (SAS). As will be appreciated by those of ordinary skill in the art, host interface 126 can be included as part of controller 120. Although FIG. 1 depicts the co-location of host surveillance unit 103 and DSD 106, in other embodiments the two need not be physically co-located. In such embodiments, DSD 106 may be located remotely from host surveillance unit 103 and connected to host surveillance unit 103 via a network interface.

In the example of FIG. 2, disk 150 is rotated by a spindle motor (not shown) and head 136 is positioned to read and write data on the surface of disk 150. In more detail, head 136 is connected to the distal end of actuator 130 which is rotated by Voice Coil Motor (VCM) 132 to position head 136 over disk 150 to read or write data in tracks 152 on disk 150.

As shown in FIG. 2, disk 150 includes a number of radially spaced, concentric tracks 152 for storing data. In some implementations, tracks 152 may be written using Shingled Magnetic Recording (SMR) such that tracks 152 overlap. In other implementations, tracks 152 may not overlap or disk 150 may include both overlapping and non-overlapping tracks 152. Disk 150 also includes servo wedges (not shown) along tracks 152 that are used to control the position of head 136 in relation to disk 150. Controller 120 uses the servo wedges to control the position of head 136 with VCM control signal 34 and controls the rotation of disk 150 with SM control signal 38.

DSD 106 also includes NVSM 128 for storing data in an NVM. While the description herein refers to solid-state memory generally, it is understood that solid-state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistive RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof.

In FIG. 2, DSD 106 also includes memory 140, which can include, for example, a Dynamic Random Access Memory (DRAM). Memory 140 can be used by DSD 106 to temporarily store data. Data stored in memory 140 can include data read from NVM such as disk 150 or NVSM 128, or data to be stored in NVM. As shown in FIG. 2, memory 140 also stores instructions loaded from DSD firmware 28, which are executed by controller 120 to control operation of DSD 106. Memory 140 may also store data used in executing DSD firmware 28. As described in more detail below, memory 140 includes buffer 30 for storing vehicle data before writing the vehicle data on disk 150.

DSD 106 also includes sensor 122 which provides input 20 to controller 120 indicating a level of mechanical shock to device 107. Sensor 122 can include, for example, an accelerometer such as a piezoelectric acceleration transducer or other type of shock sensor. In other embodiments, sensor 122 may be external to DSD 106. In one such embodiment, host surveillance unit 103 may include a sensor for detecting a level of mechanical shock and may provide DSD 106 with an input indicating a level of mechanical shock or a high shock event. In yet other embodiments, device 107 may receive an input from ECU 101 indicating a level of mechanical shock, a shock event, or an impact detected by sensor 102.

In the example of FIG. 2, host surveillance unit 103 is shown as interfacing with ECU 101 and camera 104 which allows host surveillance unit 103 to collect vehicle data that can be stored in DSD 106 via host interface 126. In addition, host surveillance unit 103 communicates with remote storage device 109 via network 105. This can allow host surveillance unit 103 to send vehicle data stored in DSD 106 to remote storage device 109. Network 105 can include, for example, a local or wide area network, or the Internet. In an embodiment, where device 107 is not located in a vehicle, host surveillance unit 103 can retrieve surveillance data from DSD 106 to send to remote storage device 109.

Data Preservation

During normal operation, host interface 126 receives host read and write commands from host surveillance unit 103 for reading and writing vehicle or surveillance data in NVM of DSD 106. For data to be written on disk 150, controller 120 stores the vehicle or surveillance data in buffer 30 and a read/write channel (not shown) of controller 120 may encode the buffered data into write signal 32 which is provided to head 136 for magnetically writing data on disk 150. Controller 120 can also provide VCM control signal 34 to VCM 132 to position head 136 over a particular track 152 for writing the data. In one embodiment, due to their relative costs, the storage capacity of disk 150 may be much larger than the NVSM 128, and as such adapted to store a high volume of surveillance or vehicle data that may be continuously generated. As such, surveillance or vehicle data such as video, audio data, etc. may be continuously written to the disk 150.

In response to a read command for data stored on disk 150, controller 120 positions head 136 over a particular track 152. Controller 120 controls head 136 to magnetically read data stored in the track and to send the read data as read signal 32. A read/write channel of controller 120 can then decode and buffer the data in memory 140 for transmission to host surveillance unit 103 via host interface 126.

For data to be stored in NVSM 128, controller 120 receives data from host interface 126 and may buffer the data in memory 140. In one implementation, the data is then encoded into charge values for charging cells (not shown) of NVSM 128 to store the data.

In response to a read command for data stored in NVSM 128, controller 120 in one implementation reads current values for cells in NVSM 128 and decodes the current values into data that can be transferred to host surveillance unit 103 via host interface 126.

While disk 150 may accommodate a high volume of surveillance or vehicle data that may be continuously generated, in the event of a high level of mechanical shock to device 107 (such as the case of an accident), disk 150 is generally more susceptible than NVSM 128 to becoming inaccessible due to the moving parts required for operation of disk 150. For example, an impact to device 107 may cause head 136 to contact disk 150 such that head 136 no longer works properly or that the surface of disk 150 can no longer store data. In another example, an impact to device 107 may cause loose particles to accumulate on a surface of disk 150 such that it can no longer reliably access data.

The processes discussed below therefore attempt to preserve vehicle or surveillance data that would otherwise be stored on disk 150 in the event of a high level of mechanical shock. In one implementation, if input 20 from sensor 122 indicates a high level of mechanical shock, vehicle or surveillance data stored in buffer 30 for storage on disk 150 can instead be stored in NVSM 128. In this way, data that would have been written to disk 150 is diverted to NVSM 128 where it has a better chance of being accessible later. Such vehicle or surveillance data stored in buffer 30 may include important information concerning the cause of the high level of mechanical shock given its temporal proximity to the event. In this regard, the data stored in buffer 30 can include data captured prior to an event causing the high level of mechanical shock.

For example, in the case where the shock is caused by an accident, the vehicle or surveillance data at or around the time of impact may be critical in determining the cause of the accident. Such critical data is diverted to the NVSM 128, which as discussed above, has a better shock tolerance. This scheme of diversion upon shock detection ensures that disk 150 can be fully utilized to save the large volume of continuously generated surveillance or vehicle data while NVSM 128, likely smaller in capacity, is specifically utilized to provide an enhanced location for preserving data potentially critical to accident investigation, especially in the case where disk 150 is damaged by the accident. In addition to the diversion of data upon shock, when input 20 from sensor 122 indicates a high level of mechanical shock, a status for storing vehicle or surveillance data on disk 150 can be determined. In one embodiment, the status determination ensures the disk is checked to see whether it has been damaged or rendered inoperable in some way by the shock. This provides a way for the DSD 106 to determine whether it can resume saving data into the disk 150.

In another embodiment, NVSM 128 may be used to preserve other important data based on an input received by device 107. In one example, ECU 101 may provide an input to host surveillance unit 103 based on an impact detected by sensor 102. Host surveillance unit 103 may in turn command DSD 106 to store a copy of the vehicle data in buffer 30 in NVSM 128 as a backup since such data may be important. This backup can prove useful in cases where the impact detected by sensor 102 is not large enough to trigger the diversion of vehicle data from buffer 30 to NVSM 128. One such example might include vehicle 100 hitting a pedestrian.

Figure 3:
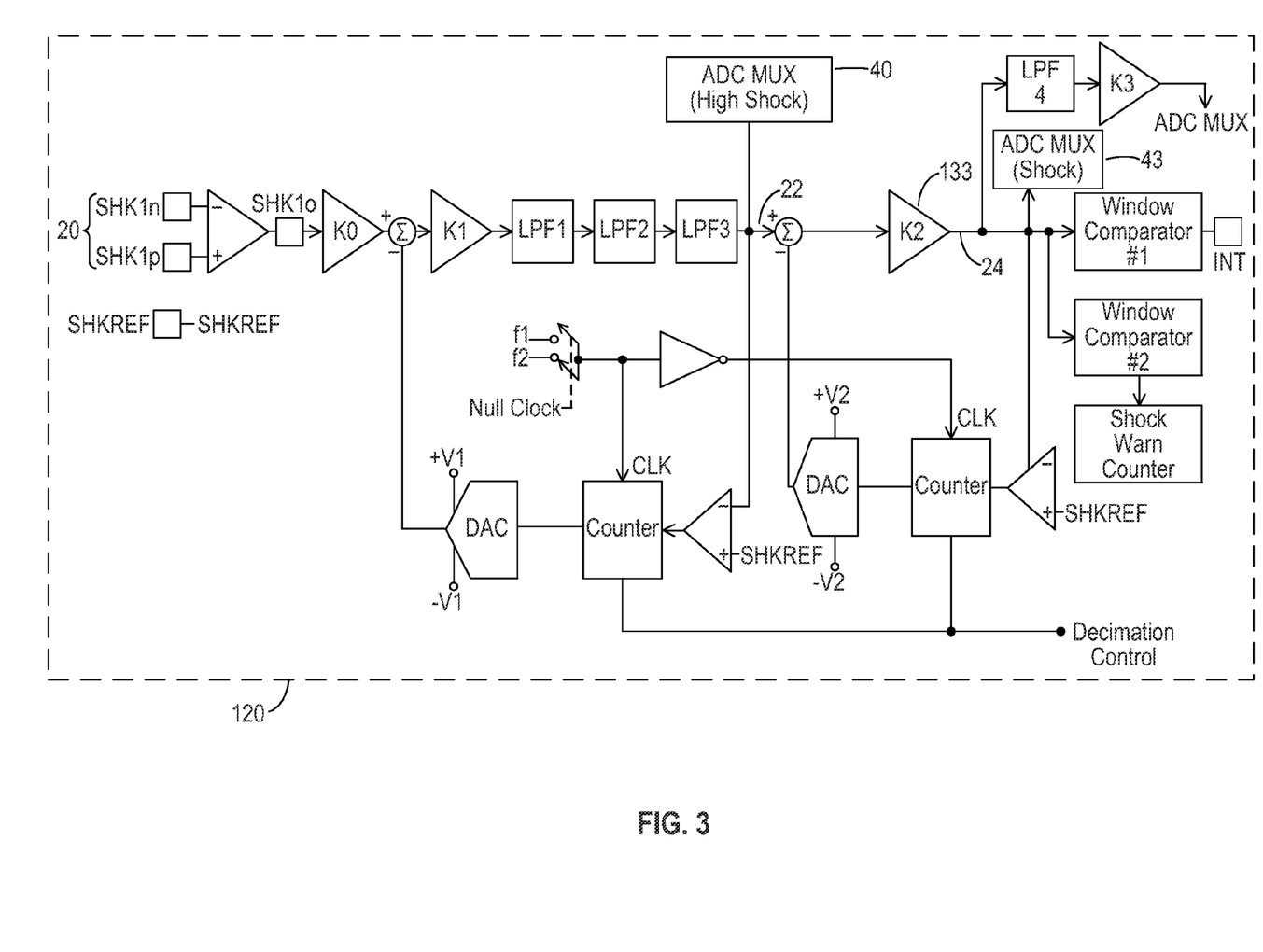
FIG. 3 is a circuit diagram for a controller of the device of FIGS. 1 and 2 according to an embodiment.

FIG. 3 is a circuit diagram depicting circuitry of controller 120 according to an embodiment. Other implementations of controller 120 may use a different arrangement of circuitry. As shown in the example implementation of FIG. 3, input 20 is received by controller 120 at terminals SHK1n and SHK1p, and is amplified by gain K0 before being subtracted by a processed feedback signal. The subtracted signal is amplified by gain K1 before passing through a series of low pass filters LPF1, LPF2, and LPF3 to yield first shock signal 22.

First shock signal 22 is sampled by high shock Analog to Digital Converter (ADC) multiplexer (MUX) 40 so that controller 120 can determine whether input 20 indicates a level of mechanical shock exceeding a first threshold. If so, controller 120 determines that there has been a high shock event or impact to device 107.

In the example of FIG. 3, first shock signal 22 is further processed into second shock signal 24 that is used by controller 120 to determine whether input 20 indicates that the level of mechanical shock corresponds to a lower level of mechanical shock, such as a vibration or a smaller shock to device 107. In more detail, first shock signal 22 is subtracted by another processed feedback signal before being amplified by shock signal amplifier 133 with gain K2. Second shock signal 24 is then sampled by shock ADC MUX 43 so that controller 120 can determine whether input 20 indicates a level of mechanical shock exceeding a second threshold that corresponds to less mechanical shock than the first threshold. One or more voltage window comparators can also be used to compare shock levels over a period of time by comparing second shock signal 24 to previous instances of second shock signal 24.

By using first shock signal 22 before it is amplified by shock signal amplifier 133, it is ordinarily possible to better detect a high shock event. In particular, conventional DSDs may use a high gain (e.g., K2) to better detect smaller shock levels with, for example, second shock signal 24. However, second shock signal 24 may saturate at a relatively low level (e.g., at a relatively low acceleration) which can prevent controller 120 from differentiating between high shock events (e.g., a collision of vehicle 100) and low shock events (e.g., vehicle 100 driving over a pothole).

Example Data Storage Processes

Figure 4:
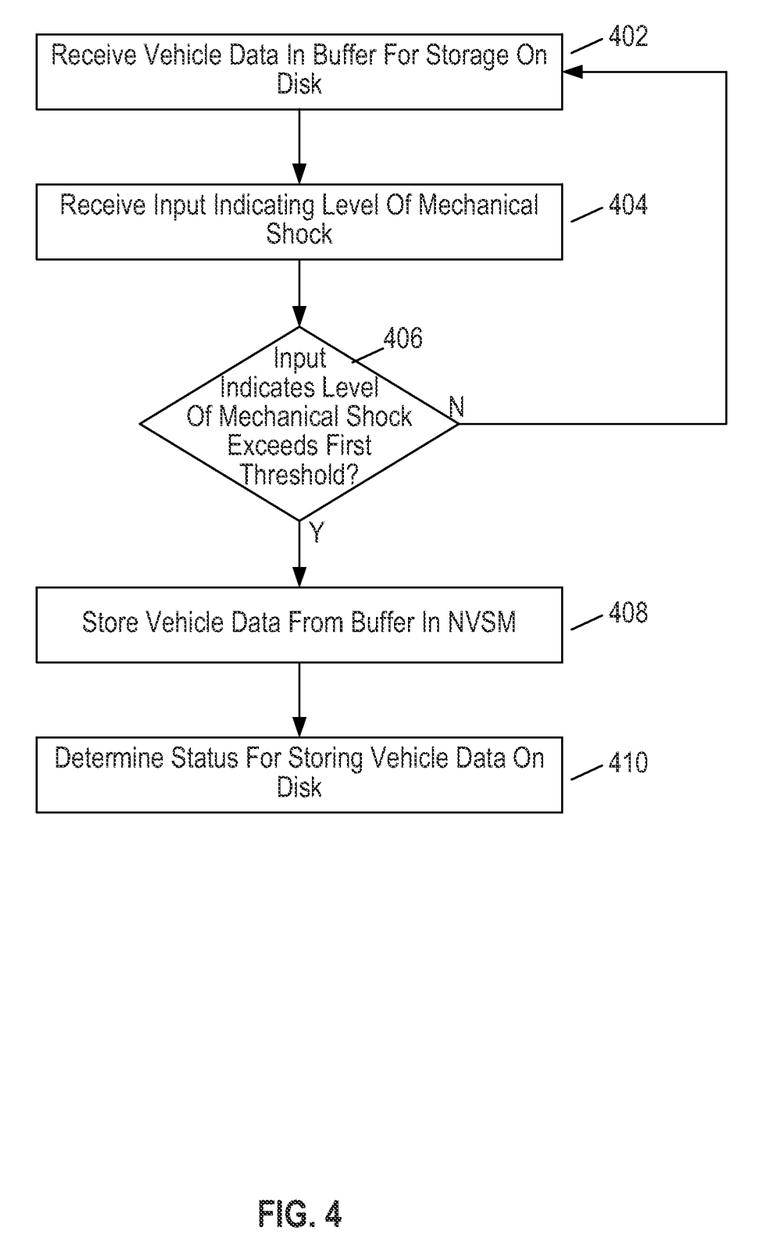
FIG. 4 is a flowchart for a data storage process that considers a level of mechanical shock according to an embodiment.

FIG. 4 is a flowchart for a data storage process that can be performed by controller 120 executing DSD firmware 28 according to an embodiment. In block 402, vehicle data is received in buffer 30 for storage on disk 150. The vehicle data may come from host surveillance unit 103 and include data such as image or video data from camera 104, or vehicle data from ECU 101 such as information concerning an impact detected by sensor 102, a speed or acceleration of vehicle 100, seat belt or airbag indicators, or a braking or steering history for vehicle 100.

In block 404, controller 120 receives input 20 indicating a level of mechanical shock. Circuitry of controller 120, such as the example circuitry of FIG. 3, can then process input 20 into first shock signal 22. In some implementations, input 20 may come from sensor 122 of DSD 106. In other implementations, input 20 can come from a sensor outside of DSD 106 or outside of device 107.

In block 406, controller 120 determines whether input 20 indicates a level of mechanical shock that exceeds a first threshold that indicates an impact to device 107. If not, the process returns to block 402 to continue to receive vehicle data into buffer 30 for storage on disk 150. On the other hand, if input 20 indicates a level of mechanical shock exceeding the first threshold, controller 120 in block 406 stores vehicle data from buffer 30 in NVSM 128. As noted above, NVSM 128 is generally better able to withstand high levels of mechanical shock and continue operation as compared to disk 150. Storing vehicle data in NVSM after a high shock event therefore serves as a protective measure to help ensure that the data is safely stored and will be available for later retrieval.

Figure 6:
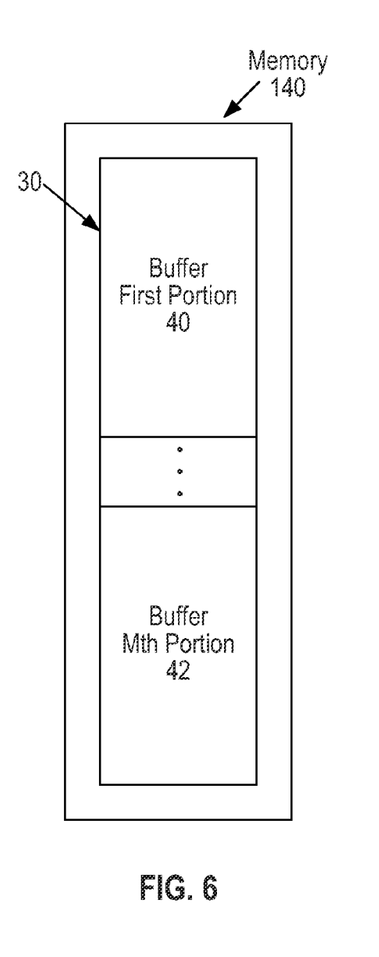
FIG. 6 is a diagram depicting a buffer with multiple portions according to an embodiment.

For its part, buffer 30 allows for a time delay before storing the vehicle data on disk 150 so that the vehicle data can be diverted to NVSM 128 in the event of a high shock event. FIG. 6 provides an example diagram of buffer 30 in memory 140. As shown in FIG. 6, buffer 30 includes multiple portions with first portion 40 up to an Mth portion 42. In one implementation, buffer 30 includes first portion 40 and a second portion so that vehicle data can be received into first portion 40 while storing vehicle data on disk 150 that was previously received in the second portion. Additional portions of buffer 30 can be used to further delay storage of vehicle data on disk 150. Buffer 30 and the portions of buffer 30 can be sized to provide a particular amount of time delay in recording data preceding, during, or following a high level of mechanical shock.

Returning to the process of FIG. 4, controller 120 in block 408 stores vehicle data from buffer 30 in NVSM 128 if it is determined in block 406 that input 20 indicates a level of mechanical shock exceeding the first threshold. In block 410, controller 120 determines a status for storing vehicle data on disk 150. This can include, for example, performing a diagnostic test on disk 150 such as attempting to perform a test write and a test read on disk 150.

In other embodiments, the process of FIG. 4 could be applied to a device for capturing surveillance data rather than vehicle data. As noted above, such a surveillance system can be located in, for example, a business, home, warehouse, institution, or a public place.

Figure 5:
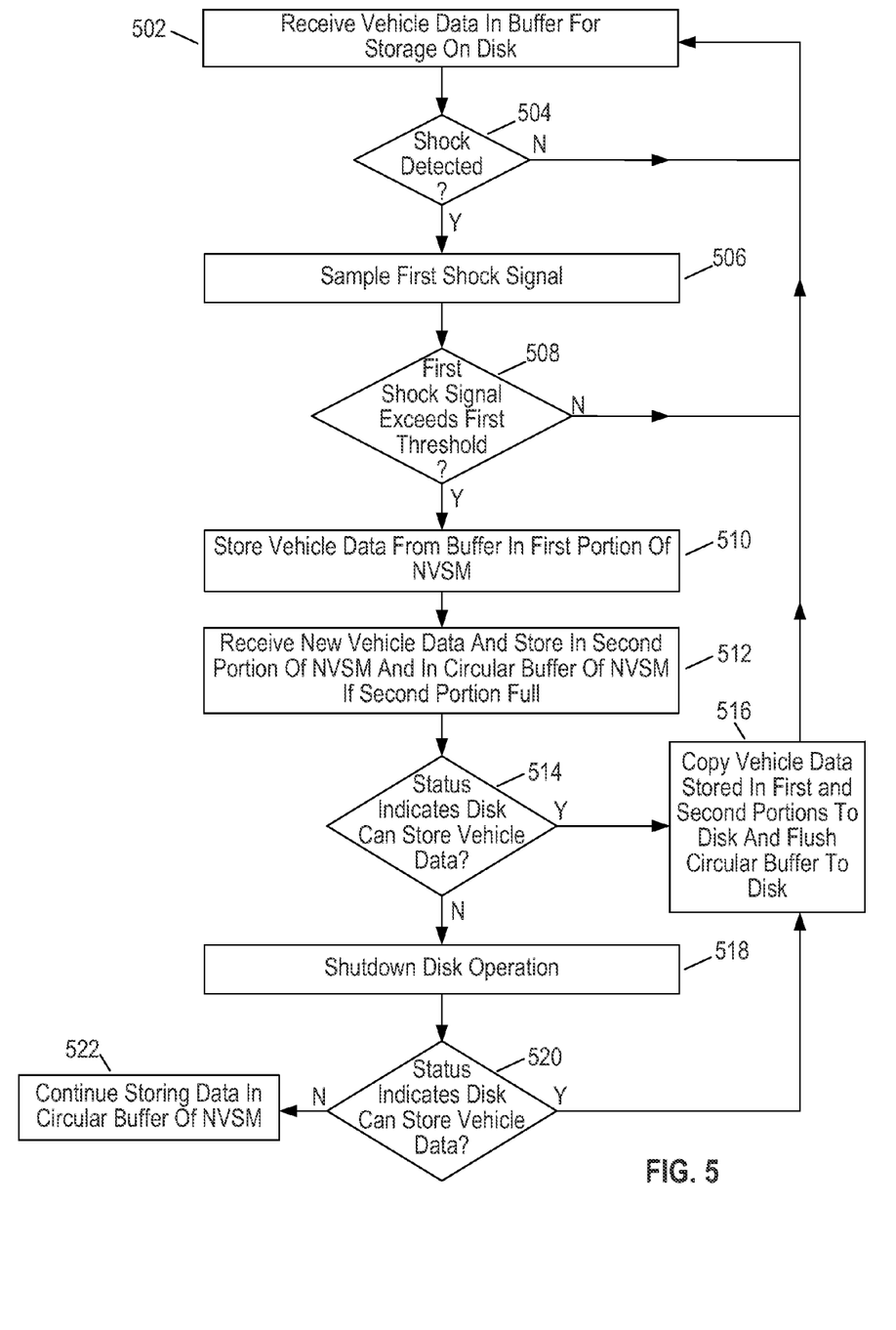
FIG. 5 is a flowchart for another data storage process that considers a level of mechanical shock according to an embodiment.

FIG. 5 is a flowchart for another data storage process that can be performed by controller 120 executing DSD firmware 28 according to an embodiment. Although the process of FIG. 5 is described in terms of vehicle data, other embodiments could be applied to surveillance data that is unrelated to a vehicle.

In block 502 of FIG. 5, vehicle data is received in buffer 30 for storage on disk 150. In block 504, controller 120 determines whether a mechanical shock was detected. This can be accomplished by receiving an input from sensor 122 or from host surveillance unit 103 or ECU 101 indicating a mechanical shock. If no shock event is detected in block 504, the process returns to block 502 to continue to receive vehicle data in buffer 30 for storage on disk 150.

If a shock is detected in block 504, first shock signal 22 is sampled by controller 120 in block 506. In block 508, controller 120 determines whether first shock signal 22 exceeds a first threshold indicating an impact such as to vehicle 100, device 107, and/or DSD 106. If first shock signal 22 does not exceed the first threshold in block 508, the process returns to block 502 to receive vehicle data in buffer 30 for continued storage on disk 150.

On the other hand, if first shock signal 22 exceeds the first threshold in block 508, controller 120 in block 510 stores vehicle data from buffer 30 in a first portion of NVSM 128 reserved for storing vehicle data. Since the vehicle data leading up to an impact and immediately following the impact can often be important in determining the cause of the impact, NVSM 128 can include portions reserved for storing such vehicle data.

Figure 7:
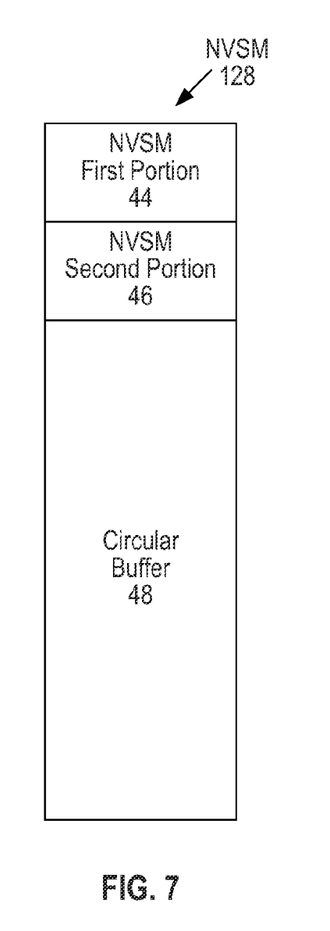
FIG. 7 is a diagram depicting two reserved portions and a circular buffer of a Non-Volatile Solid-State Memory (NVSM) according to an embodiment.

FIG. 7 is an example diagram of NVSM 128 with two reserved portions and a circular buffer according to an embodiment. As shown in FIG. 7, NVSM 128 includes first portion 44, second portion 46, and circular buffer 48. First portion 44 can store a predetermined amount of vehicle data from buffer 30 upon determining that input 20 indicates the level of mechanical shock exceeds the first threshold. First portion 44 may therefore be sized to correspond to a portion of buffer 30 such as buffer portion 40.

Second portion 46 of NVSM 128 can store a predetermined amount of vehicle data received after determining that input 20 indicates the level of mechanical shock exceeds the first threshold. The vehicle data received after an impact may also be important in recording subsequent impacts that follow the first impact. For example, many accidents involve a series of impacts, and as such data around the time of each impact may have its critical significance. Second portion 46 may be sized to store vehicle data for a certain amount of time following a first impact at a particular data rate for receiving the vehicle data from host surveillance unit 103.

Circular buffer 48 of NVSM 128 can be used by controller 120 to record data after first portion 44 and second portion 46 have been filled. Since the capacity of NVSM 128 is generally limited, circular buffer 48 allows for vehicle data to continue to be recorded following one or more impacts. Once circular buffer 48 becomes full, and therefore NVSM 128, new vehicle data can overwrite previously recorded vehicle data stored in circular buffer 48. In this way, it is ordinarily possible to preserve vehicle data closer in time to the high level of mechanical shock in first portion 44 and second portion 46, while still storing new vehicle data that is received after the high level of mechanical shock.

Figure 8:
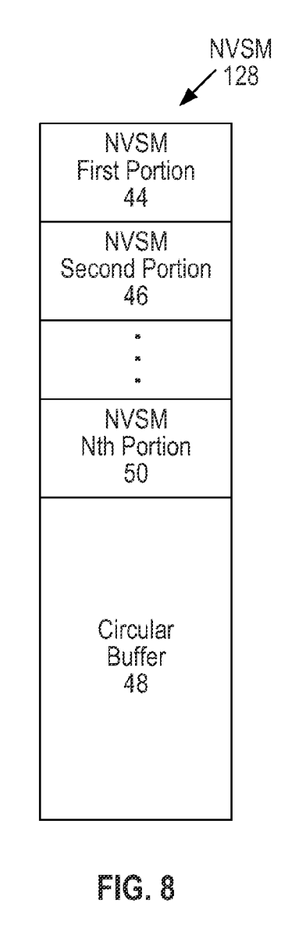
FIG. 8 is a diagram depicting more than two reserved portions and a circular buffer of an NVSM according to an embodiment.

Other implementations of NVSM 128 may be arranged differently. In this regard, FIG. 8 provides an example where NVSM 128 includes more than two reserved portions and a circular buffer. As shown in FIG. 8, NVSM 128 includes first portion 44, second portion 46, and other reserved portions up to an Nth portion 50. The additional portions of NVSM 128 can be reserved to store vehicle data from buffer 30 if input 20 indicates a subsequent impact following a first impact.

In one implementation, upon determining that input 20 exceeds the first threshold, vehicle data is stored in first portion 44 from buffer 30. A predetermined amount of new vehicle data following the determination that input 20 exceeded the first threshold can be stored in second portion 46 as in the example of FIG. 7. New vehicle data received after first portion 44 and second portion 46 have been filled can be stored in circular buffer 48 as in FIG. 7. However, unlike the example of FIG. 7, if a subsequent input 20 indicates a new level of mechanical shock exceeding the first threshold, vehicle data from buffer 30 is stored in an additional reserved portion such as Nth portion 50. This can ordinarily allow for vehicle data captured around the time of a later impact to be preserved in NVSM 128, which as discussed above, may be helpful in preserve data in accidents involving multiple impacts. Additional reserved portions in NVSM 128 can also allow for preserving vehicle data for additional impacts that follow a predetermined amount of time after the first impact.

In yet another implementation, second portion 46 may not be used to store a predetermined amount of vehicle data after a first impact. Instead, second portion 46 may be reserved to store vehicle data around the time of a second impact such that the reserved portions of NVSM 128 only store vehicle data from around the time of impacts and all non-impact related vehicle data is stored in circular buffer 48.

Other implementations of NVSM 128 are also possible. For example, NVSM 128 may only include a single reserved portion for preserving data around the time of a first impact and with the rest of NVSM 128 serving as a circular buffer for recording vehicle data following the first impact.

Returning to the data storage process of FIG. 5, controller 120 in block 512 receives new vehicle data and stores it in second portion 46 of NVSM 128. After second portion 46 becomes full, new vehicle data is stored in circular buffer 48.

In block 514, controller 120 determines a status for storing vehicle data on disk 150. This may be accomplished by performing a diagnostic test on disk 150, such as attempting to write test data on disk 150 and then attempting to read the test data. In such an implementation, if the test data is successfully written and read, controller 120 determines in block 514 that vehicle data can be stored on disk 150.

If the status in block 514 indicates that disk 150 can store vehicle data, controller 120 in block 516 copies to disk 150 vehicle data stored in first portion 44 and second portion 46 of NVSM 128. The vehicle data copied from first portion 44 and second portion 46 may remain in NVSM 128 as a backup copy of vehicle data pertaining to a high shock level event. In some embodiments, this data may be retrieved by host surveillance unit 103 and sent to remote storage device 109 via network 105.

Circular buffer 48 is also flushed to disk 150 in block 516. In this regard, data stored in circular buffer 48 is migrated to disk 150 and the data stored in circular buffer 48 is then erased or marked as invalid. The process of FIG. 5 then returns to block 502 to continue to receive vehicle data in buffer 30 for storage on disk 150.

On the other hand, if it is determined that the status in block 514 indicates that disk 150 cannot store vehicle data, controller 120 in block 518 shuts down operation of disk 150. This can include moving head 136 away from disk 150 and spinning disk 150 down to stop its rotation.

In block 520, controller 120 can determine an additional status for storing vehicle data on disk 150. This check can be performed to see if a temporary condition preventing storage of data on disk 150 has improved so that data can again be stored on disk 150. Controller 150 in block 520 may perform a diagnostic test on disk 150 which can involve attempting to spin up disk 150 to an operational speed and attempting to write and read test data on disk 150. If the additional status indicates that disk 150 can store vehicle data, the process proceeds to block 516 to copy vehicle data stored in first portion 44 and second portion 46 of NVSM 128 and to flush vehicle data stored in circular buffer 48 to disk 150.

If the additional status in block 520 indicates that disk 150 cannot store vehicle data, the process proceeds to block 522 to continue to store new vehicle data in circular buffer 48 and the process of FIG. 5 ends. In other embodiments, controller 120 may check the status of disk 150 for storing data more than one additional time. For example, controller 120 may periodically check the status of disk 150 during a predetermined amount of time following the initial determination in block 514 that disk 150 cannot store data.

As discussed above, by storing data from buffer 30 in NVSM 128 upon determining that there is a high level of mechanical shock, it is ordinarily possible to preserve data that may have otherwise been lost in attempting to write the data on disk 150.

Other Embodiments

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A device adapted to capture vehicle data related to a vehicle in motion, the device comprising:
a disk for storing vehicle data;
a Non-Volatile Solid-State Memory (NVSM) for storing vehicle data;
a memory including a buffer for storing vehicle data before writing the vehicle data on the disk; and
a controller configured to:
receive vehicle data into the buffer for storage on the disk;
receive an input indicating a level of mechanical shock;
determine whether the input indicates the level of mechanical shock exceeds a first threshold indicative of an impact; and
if the input indicates the level of mechanical shock exceeds the first threshold:
store vehicle data from the buffer in the NVSM; and
determine a status for storing vehicle data on the disk.

2. The device of claim 1, wherein the controller is further configured to determine an additional status for storing vehicle data on the disk if the status for storing vehicle data on the disk previously indicated that vehicle data could not be stored on the disk.

3. The device of claim 1, wherein in determining the status for storing vehicle data on the disk, the controller is further configured to perform a diagnostic test on the disk.

4. The device of claim 1, wherein the controller includes a shock signal amplifier, and wherein the controller is further configured to:
process the input into a first shock signal used by the controller to determine whether the input indicates the level of mechanical shock exceeds the first threshold;

process the first shock signal into a second shock signal using the shock signal amplifier; and determine based on the second shock signal whether the input indicates the level of mechanical shock exceeds a second threshold, the second threshold corresponding to less mechanical shock than the first threshold.

5. The device of claim 1, wherein the NVSM includes a first portion reserved for storing vehicle data from the buffer upon determining that the input indicates the level of mechanical shock exceeds the first threshold indicative of an impact.

6. The device of claim 5, wherein the NVSM includes a second portion reserved for storing a predetermined amount of new vehicle data received by the controller for storage in the device after determining that the input indicates the level of mechanical shock exceeds the first threshold.

7. The device of claim 5, wherein the NVSM includes a third portion, and wherein the controller is further configured to:
receive new vehicle data into the buffer for storage in the device after determining that the input indicates the level of mechanical shock exceeds the first threshold;
receive an additional input indicating a subsequent level of mechanical shock;
determine whether the additional input indicates the subsequent level of mechanical shock corresponds to an additional impact; and
store the new vehicle data from the buffer in the third portion of the NVSM if the additional input indicates the subsequent level of mechanical shock corresponds to an additional impact, wherein the third portion of the NVSM is reserved for storing a predetermined amount of the new vehicle data from the buffer.

8. The device of claim 1, wherein the NVSM includes a circular buffer, and wherein the controller is further configured to:
receive new vehicle data for storage in the device after determining that the input indicates the level of mechanical shock exceeds the first threshold; and
store the new vehicle data in the circular buffer.

9. The device of claim 1, wherein the buffer includes a first portion and a second portion, and wherein the controller is further configured to receive vehicle data into the first portion of the buffer for storage on the disk while storing vehicle data on the disk that was previously received in the second portion of the buffer.

10. The device of claim 1, further comprising a video camera, wherein the vehicle data includes video data from the video camera.

11. The device of claim 1, further comprising a host in communication with a remote storage device via a network, and wherein the host is configured to:
retrieve vehicle data stored in the NVSM; and
send the retrieved vehicle data to the remote storage device via the network.

12. A method of operating a device adapted to capture vehicle data related to a vehicle in motion, the device including a disk and a Non-Volatile Solid-State Memory (NVSM) for storing vehicle data, the method comprising:
receiving vehicle data into a buffer of the device for storage on the disk;
receiving an input indicating a level of mechanical shock;
determining whether the input indicates the level of mechanical shock exceeds a first threshold indicative of an impact; and if the input indicates the level of mechanical shock exceeds the first threshold:
storing vehicle data from the buffer in the NVSM; and
determining a status for storing vehicle data on the disk.

13. The method of claim 12, further comprising determining an additional status for storing vehicle data on the disk if the status for storing vehicle data on the disk previously indicated that vehicle data could not be stored on the disk.

14. The method of claim 12, wherein in determining the status for storing vehicle data on the disk, the method further comprises performing a diagnostic test on the disk.

15. The method of claim 12, further comprising:
processing the input into a first shock signal used to determine whether the input indicates the level of mechanical shock exceeds the first threshold;
processing the first shock signal into a second shock signal using a shock signal amplifier; and
determining based on the second shock signal whether the input indicates the level of mechanical shock exceeds a second threshold, the second threshold corresponding to less mechanical shock than the first threshold.

16. The method of claim 12, further comprising storing vehicle data from the buffer in a reserved first portion of the NVSM upon determining that the input indicates the level of mechanical shock exceeds the first threshold indicative of an impact.

17. The method of claim 16, further comprising:
receiving a predetermined amount of new vehicle data for storage in the device after determining that the input indicates the level of mechanical shock exceeds the first threshold; and
storing the predetermined amount of new vehicle data in a reserved second portion of the NVSM.

18. The method of claim 16, further comprising:
receiving new vehicle data into the buffer for storage in the device after determining that the input indicates the level of mechanical shock exceeds the first threshold;
receiving an additional input indicating a subsequent level of mechanical shock;
determining whether the additional input indicates the subsequent level of mechanical shock corresponds to an additional impact; and
storing the new vehicle data from the buffer in a third portion of the NVSM if the additional input indicates the subsequent level of mechanical shock corresponds to an additional impact, wherein the third portion of the NVSM is reserved for storing a predetermined amount of the new vehicle data from the buffer.

19. The method of claim 12, further comprising:
receiving new vehicle data for storage in the device after determining that the input indicates the level of mechanical shock exceeds the first threshold; and
storing the new vehicle data in a circular buffer of the NVSM.

20. The method of claim 12, further comprising receiving vehicle data into a first portion of the buffer for storage on the disk while storing vehicle data on the disk that was previously received in a second portion of the buffer.

21. The method of claim 12, wherein the vehicle data includes video data from a video camera.

22. The method of claim 12, further comprising:
retrieving vehicle data stored in the NVSM; and
sending the retrieved vehicle data to a remote storage device via a network.

* * * * *